Aug. 14, 1934.   A. ARUTUNOFF   1,970,484
OIL FILLED SUBMERGIBLE ELECTRIC MOTOR
Filed March 30, 1933
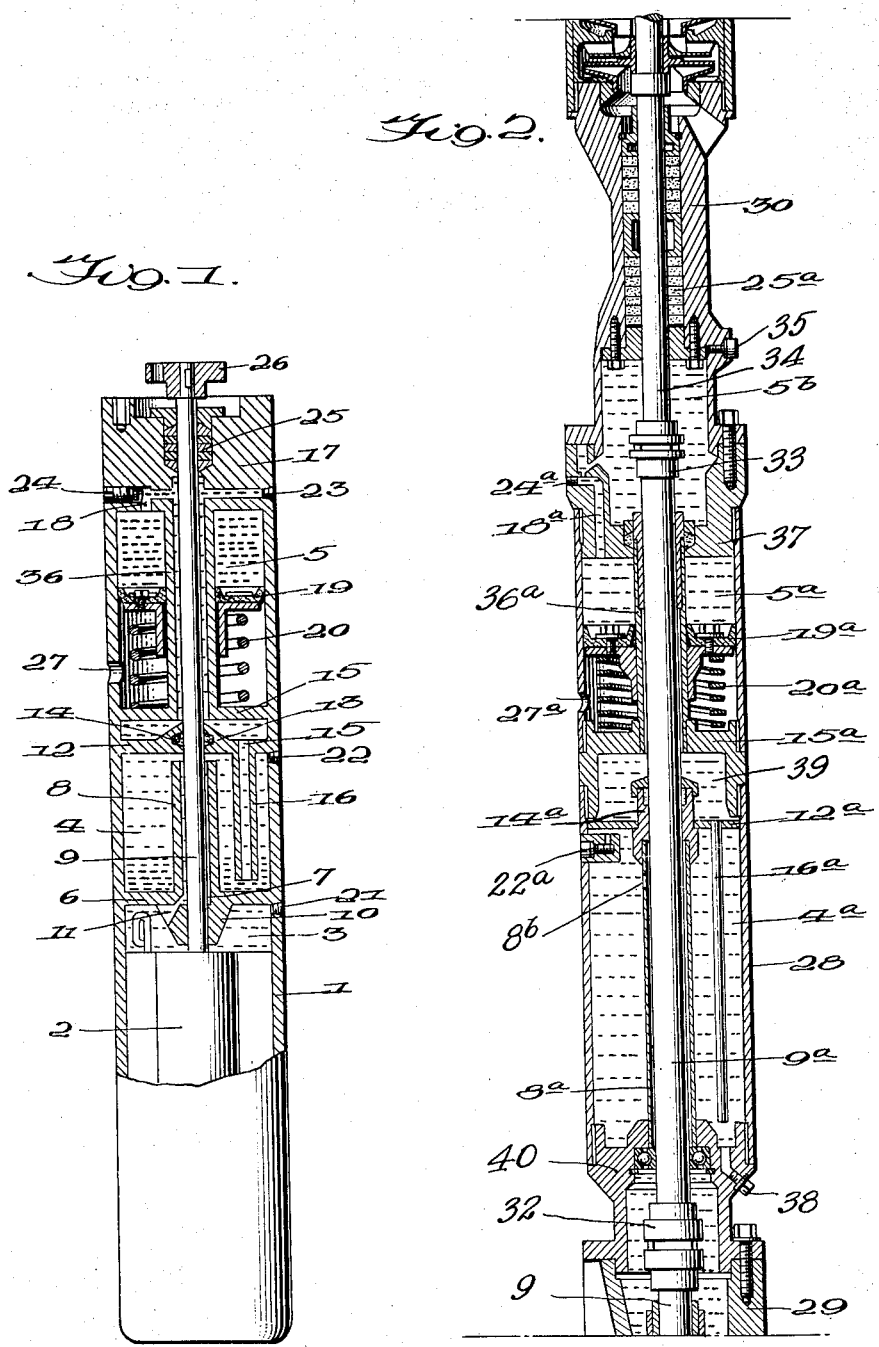
Inventor
A. Arutunoff,
By
Attorneys Patented Aug. 14, 1934

1,970,484

UNITED STATES PATENT OFFICE

1,970,484

OIL FILLED SUBMERGIBLE ELECTRIC MOTOR

Armais Arutunoff, Tulsa, Okla., assignor to Reda Pump Company, Bartlesville, Okla.

Application March 30, 1933, Serial No. 663,597

14 Claims. (Cl. 172—36)

My invention consists in new and useful improvements in protecting means for submergible electric motors, and covers an improvement on my former invention shown and described in Letters Patent No. 1,855,274 issued to me on April 26, 1932.

As in the former case, the invention relates to means for protecting the electric motor of deep well pumps of the type designed to be submerged in the fluid to be pumped, having for its primary object to provide a simple and efficient means whereby the oil in the motor unit, acting as a seal, is prevented from displacement in course of time although subjected to somewhat higher internal pressure than the pressure surrounding the motor housing.

In my former invention, the chambers containing the protecting fluid were in communication with the fluid surrounding the unit, and certain arrangements were provided to permit the escape of a predetermined quantity of protecting fluid upon the expansion thereof when the motor was running, and upon the stopping of the motor and contraction of the protecting fluid, to permit an equal quantity of the surrounding fluid to be drawn into the protecting fluid chambers, without coming in contact with any of the working parts of the mechanism, and upon the restarting of the motor, this last named fluid was again forced out into the area around the unit.

Now, with my present invention, I have eliminated all communication between the protecting fluid chambers and the fluid in which the unit is submerged, this as a precaution against molecular transfer of moisture from the outside through the body of protecting oil.

With the above and other objects in view which will appear as the description proceeds, my invention consists in the novel features herein set forth, illustrated in the accompanying drawing and more particularly pointed out in the appended claims.

Referring to the drawing in which numerals of like character designate similar parts throughout both views, Fig. 1 is a simplified sectional view partly in elevation showing a motor housing for a motor of the vertical shaft type, provided with one form of my improved protecting means, and Fig. 2 is a modified form wherein the protecting means, with the exception of a stuffing box, are combined in a separate housing interposed between the motor and pump units.

In the drawing, (referring to Fig. 1) 1 represents a cylindrical housing or shell for a vertical type electric motor 2, said housing being separated into a motor chamber 3, a reservoir 4 and a grease chamber 5. A transverse partition 6 forms the upper boundary of the motor chamber 3 and the lower boundary of the reservoir 4, said partition being provided with a central vertical aperture 7, co-axial with the bore of an annular upwardly directed sleeve 8 which is integral with the upper face of the partition 6 and spaced apart from the shaft 9 extending upwardly from the motor 2 through the housing 1. On the lower face of the partition 6, I preferably provide a thickened bearing portion 10 for the shaft 9, a port 11 placing the opening 7 in communication with the interior of the motor chamber 3.

Bounding the upper extremity of the reservoir 4 is a partition 12 centrally of which I provide a thickened bearing portion 13 carrying a stuffing box 14 for the shaft 9, said partition being apertured as at 15 to one side of its axis and carrying a depending sleeve 16 which extends from the underside of the partition 12 to a point adjacent the lower extremity of the reservoir 4, thereby placing the lower portion of said reservoir in communication with the area above the partition 12.

A predetermined distance above the partition 12 I provide a partition 15 which forms the lower boundary of the grease chamber 5, the area between the partitions 12 and 15 comprising an intermediate protecting fluid chamber which is in communication with the upper end of the grease chamber 5 through a sleeve or conduit 36, the latter being integral or rigidly fixed between the partition 15 and the upper end 17 of the housing 1 and spaced apart from the periphery of the shaft 9 which extends vertically therethrough. A conduit 18 in the top piece 17 establishes communication between the grease chamber 5 and the interior of the sleeve 36.

19 represents an annular plunger which fits snugly within the grease chamber 5 and slidably embraces the co-axial sleeve 36, said plunger being normally urged upwardly by a coil spring or the like 20, interposed between the underface of the plunger and the upper-face of the partition 15. That portion of the grease chamber beneath the plunger 19 is placed in communication with the surrounding fluid by an opening 27 in the wall of the housing 1 for the purpose hereinafter set forth.

21, 22 and 23 designate openings for use in charging the chambers with protecting fluid as hereinafter described and may be provided with suitable closures, and 24 designates a similar opening for charging the grease chamber.

The upper end 17 of the housing 1 is provided with a stuffing box 25 for embracing the shaft 9 and is arranged for suitable connection with a pump unit, the shaft 9 being provided with a coupling 26 to permit of its connection to a pump shaft.

The modified form of my invention illustrated in Fig. 2 is fundamentally the same as that just described with the exception that instead of mounting the motor and protecting unit in a single housing, in the modified form, I employ a separate housing 28 containing the protecting parts and interposed between the motor housing 29 and the pump unit 30.

9a represents an intermediate shaft provided with couplings at both ends, the lower coupling 32 connecting the shaft 9a to the motor shaft 9, and the upper coupling 33 connecting said intermediate shaft to a pump shaft 34, whereby the motor shaft 9 and the pump shaft 34 are operatively coupled in co-axial alignment. In the upper portion of the housing 28 I provide a grease pressure chamber 5a which corresponds to the chamber 5 in Fig. 1 and above this chamber and separated therefrom by the partition 37 is an auxiliary grease chamber 5b which is formed partly by the pump unit housing, the latter being provided with a stuffing box 25a surrounding the pump shaft 34, the lower end of which terminates within the chamber 5b. The upper end of this chamber 5b is preferably provided with an air vent 35. These chambers 5a and 5b are in communication with one another through a conduit 18a which is also provided with an air vent opening 24a.

A sleeve 36a corresponding to sleeve 36 in Fig. 1 surrounds the shaft 9a and establishes communication between the chamber 5b and the intermediate fluid chamber 39, and the plunger 19a in the chamber 5a slidably embraces said sleeve and is normally urged upwardly by a coil spring or the like 20a located between the plunger and the partition 15a forming the lower boundary of chamber 5a. That portion of the chamber 5a below the plunger 19a is in communication with the exterior of the casing 28 by means of an opening 27a. A reservoir 4a in the lower portion of the casing 28 is separated from the intermediate fluid chamber 39 by a partition 12a and is in communication with said chamber through a depending sleeve or conduit 16a which terminates adjacent the lower extremity of the reservoir. The lower boundary of the reservoir 4a is formed by a partition 40 which separates said reservoir from the motor housing.

A stuffing box 14a embraces the shaft 9a at a point adjacent the partition 12a, and a sleeve 8a provided with a port 8b in its upper end surrounds the lower portion of said shaft for the entire length of the reservoir 4a thus preventing the content of the lower portion of the reservoir from coming in contact with said shaft. The reservoir is however in communication with the motor housing through the sleeve 8a and port 8b. Adjacent the upper extremity of the reservoir 4a I provide an opening 22a for use in charging the reservoir with protecting fluid, while at the lower extremity of said reservoir I provide a drain opening 38.

It will be noted that the term "shell" in the claims is intended to cover both the motor housing 29 and the protecting unit housing 28 in Fig. 2, as well as the integral housing 1 shown in Fig. 1.

The openings 22 and 23 are opened and the motor chamber 3 and reservoir 4 are completely filled through opening 21, with a suitable protecting agent such as oil. After the oil reaches the height of opening 22, this opening is closed and the filling is continued until the oil reaches the level of the opening 23 after which all openings including 21 are closed. The filling may also be accomplished in the reverse order by employing opening 23 as the oil supplying opening and openings 21 and 22 as air outlets.

After the oil charge is completed, the grease inlet 24 is opened and grease under pressure is forced into the chamber 5 compressing the spring 20. When the valve 24 is closed, the pressure of the spring 20 causes a constant upward force to be applied to the plunger 19 which, due to the communication between the oil chambers and the grease chamber, subjects the oil to the pressure of the spring 20.

The motor and protecting unit are then installed and submerged in a deep well and when the motor starts, the expansion of the oil due to heat, forces some of the protecting oil into the upper portion of the grease chamber 5 through the communicating ports and sleeves, lowering the plunger 19 against the pressure of its spring 20. When the motor stops, the contraction of the motor oil is compensated by some grease discharged from the grease chamber 5 by the rising piston 20, said grease flowing through the passage 18 down through the sleeve 36 and finally to the bottom of the reservoir 4 through sleeve 16.

Grease or heavy oil is prevented from reaching the motor although it is not in any way detrimental thereto, by the arrangement of the sleeve 8 in reservoir 4 which effects the gravity separation of the more heavy grease from the lighter motor oil.

When, after several starts and stops, grease reaches the reservoir 4 settling in the bottom thereof, as shown in the drawing, a balancing condition is established. That is, further starts and stops do not affect the combined amount of oil in the reservoir 4 and in the motor chamber 3 for the reason that all passages above the conduit or sleeve 16 are filled with grease, and whatever grease is drawn in when the motor stops, the same amount is discharged back through 16 into the grease chamber 5. The function is not changed if instead of grease or heavy oil, the grease chamber is filled by the same oil as is employed in the motor housing proper.

It will be noted that water or other surrounding fluid cannot enter the protecting unit through the stuffing box 25 as the inside pressure in the grease chamber caused by the spring 20 is supplemented by the external pressure of the surrounding fluid through the opening 27 beneath the plunger 19, thus causing a higher pressure within the grease chamber 5 than that adjacent the shaft at the stuffing box 25. For the same reason, if and when the stuffing box packing develops a leak, water cannot enter because of the fact that a certain amount of grease or oil will constantly escape due to the unequal pressures on the outside and inside of the grease chamber. However, as the inside pressure is only slightly more than the outside submergence pressure, the amount of leakage and loss of oil or grease is negligible as the grease chamber capacity may be sufficient for years of service.

With my improved structure and owing to the fact that there are no openings to the outside or surrounding fluid as in my former invention, breathing of the motor being accomplished by means of the plunger 19 against the fluid in which the motor is submerged and because of the constant higher pressure inside of the protecting unit, a far superior result is achieved.

Referring again to the modified form of my invention shown in Fig. 2, it will be noted that its operation is essentially the same as that just described. However, inasmuch as the details of structure are somewhat different, and in the interest of clarity, I will describe its operation briefly.

If it is desired to fill all of the chambers with oil, a suitable connection, not shown in the drawing, is made to the motor housing 29 into which oil is forced under pressure, the air vents 22a, 24a and 35 being opened to allow free entrance of oil into all of the compartments. The oil travels upward through the sleeve 8a and enters reservoir 4a through the opening 8b in said sleeve and when all of the air is displaced by oil, the air vent 22a is closed and the filling continued, forcing oil up through the tube 16a into compartment 39, around the shaft 9 in sleeve 36a into compartment 5b until all of the air therein has been displaced with oil. The air vent 35 is then closed and the incoming oil is then forced downwardly through the conduit 18a into the pressure chamber 5a, forcing the piston 19a downwardly and compressing the spring 20a until a proper charge of oil has been taken into the chamber 5a, thus completing the filling operation.

When the motor is set into operation, the expansion of the oil in the motor forces said oil through the ring space formed by sleeve 8a around shaft 9a, through the hole 8b, tube 16a, through the clearance around the shaft 9 into reservoir 5b and conduit 18a, into the pressure reservoir 15a, lowering the piston 19a against the pressure of its spring 20a.

When the motor stops, the oil contracts and is compensated by the expanson of the spring 20a forcing the piston 19a upwardly in the pressure chamber 5a. This causes a certain amount of the oil or grease to be discharged from the pressure chamber 5a and return in reverse order through the same passages just described. It will be noted however that a gravity separation takes place in the reservoir 4a because of the sleeve 8a and the tube 16a, whereby grease or any other fluid of higher specific gravity than the regular lubricating fluid, settles in the bottom of the reservoir 4a and is prevented from contacting shaft 9a and entering the motor housing. Light oil from the top part of the reservoir is permitted to travel toward the motor through holes 8b and down through sleeve 8a.

An accumulation of grease or heavy fluid in the lower portion of the reservoir 4a may be removed fron time to time by the drain opening 38.

It will be noted that instead of filling the entire apparatus with oil, the pressure chamber 5a may be filled with grease through the opening 24a and the other chambers filled with oil in the manner just described.

From the foregoing it is believed that the construction and advantages of my invention may be readily understood by those skilled in the art without further description, it being borne in mind that numerous changes may be made in the details disclosed without departing from the spirit of the invention as set forth in the following claims.

What I claim and desire to secure by Letters Patent is:—

1. In combination, an oil filled submergible electric motor having a shaft and adapted to drive a pump, a shell housing said motor, a partition in said shell surrounding said shaft and forming a reservoir, a chamber above said reservoir, a fluid passageway connecting said reservoir with said chamber, a plunger in said chamber, a spring normally urging said plunger toward the respective inlet of said passageway, and an opening in said shell placing that portion of said chamber beneath the plunger, in communication with the exterior of said shell.

2. In combination, an oil filled submergible electric motor having a shaft and adapted to drive a pump, a shell housing said motor and forming a reservoir adapted to be filled with a protecting fluid, an auxiliary protecting fluid chamber in communication with said shell, a plunger in said auxiliary chamber, a spring adapted to normally compress the fluid in said auxiliary chamber, and an opening in the wall of said chamber subjecting the underside of said plunger to the pressure surrounding said motor housing, whereby upon the expansion of the protecting fluid in said reservoir due to the heat of running said motor, a portion of said fluid will be caused to enter said auxiliary chamber against the pressure of said spring and upon the contraction of said protecting fluid, the same will be returned to said reservoir by the pressure of said spring.

3. In combination, an oil filled submergible electric motor, a shell housing said motor and forming a reservoir for a protecting fluid, an auxiliary protecting fluid reservoir in communication with said first named reservoir, and means supplemented by the pressure of the fluid surrounding said shell for constantly maintaining said protecting fluid under a greater pressure than that of said surrounding fluid.

4. In combination, an oil filled submergible electric motor, a shell housing said motor and forming a reservoir for a protecting fluid, an auxiliary protecting fluid reservoir in communication with said first named reservoir, and a spring actuated plunger in said auxiliary reservoir, supplemented by the pressure of the fluid surrounding said shell for constantly maintaining said protecting fluid under a greater pressure than that of said surrounding fluid.

5. In combination, an oil filled submergible electric motor, a shell housing said motor and forming a reservoir for a protecting fluid, an auxiliary protecting fluid reservoir in communication with said first named reservoir, and a spring actuated plunger in said auxiliary reservoir for constantly maintaining said protecting fluid under a greater pressure than that of said surrounding fluid.

6. In combination, an oil filled submergible electric motor, a shell housing said motor and forming a fluid reservoir, a movable partition in said reservoir separating said fluid from the medium surrounding said shell, said partition being movable toward the surrounding medium upon the expansion of said fluid in the reservoir, and means for normally urging said partition in the opposite direction.

7. In a submergible electric motor housing, a motor, a vertical shaft driven by said motor and extending axially through said housing, an oil reservoir in said housing above said motor, an auxiliary reservoir above said first named reservoir and co-axial therewith, a passageway connecting said reservoirs, an annular plunger in said auxiliary reservoir separating the latter into two compartments, the compartment on the under-side of said plunger being in communication with the fluid surrounding said housing, and spring means for normally urging said plunger toward the opposite compartment.

8. Apparatus as claimed in claim 7 wherein said reservoir and auxiliary reservoir surround said shaft and are spaced therefrom by cylindrical sleeve members.

9. Apparatus as claimed in claim 7 wherein said reservoir and auxiliary reservoir surround said shaft and are spaced therefrom by cylindrical sleeve members, said passageway connecting said auxiliary reservoir with the first named reservoir terminating at one end in a depending conduit which extends to a point adjacent the lower extremity of said first named reservoir.

10. In a submergible electric motor housing, a motor, a motor shaft extending axially through said housing, an annular partition in said housing forming a reservoir above and co-axial with said motor, said partition terminating in an upwardly extending sleeve surrounding a portion of said shaft, a second annular partition forming an auxiliary reservoir above said first named reservoir and co-axial therewith, said second partition terminating in a cylindrical sleeve surrounding said shaft, a stuffing box in the upper end of said housing around said shaft, a passageway placing said auxiliary reservoir in communication with said first named reservoir, a portion of said passageway surrounding said shaft and terminating at its upper end adjacent the packing of said stuffing box, the lower end of said passageway terminating in a depending conduit which extends to a point adjacent the bottom of said first named reservoir, a plunger in said auxiliary reservoir surrounding and slidably engaging the sleeve therein, spring means for normally urging said plunger toward one end of the auxiliary reservoir to force fluid through said passageway, and an opening in the wall of said auxiliary reservoir beneath said plunger, placing that area in communication with the fluid surrounding said housing.

11. Apparatus as claimed in claim 10 including openings for charging said reservoir and auxiliary reservoir.

12. In combination, an oil filled submergible electric motor, a shell housing said motor, a protecting unit above said motor including a reservoir for protecting fluid, an auxiliary protecting fluid reservoir above said first named reservoir and in communication therewith, a plunger in said auxiliary reservoir, a spring for normally urging said plunger toward one end of said auxiliary reservoir, and an opening in the wall of said auxiliary reservoir beneath said plunger placing that area in communication with the surrounding fluid, whereby upon the expansion of the fluid in said first named reservoir, said partition will be moved to compress the spring, and upon the contraction of said fluid, said spring will return the plunger and replace the fluid in said first named reservoir.

13. In combination with a submergible electric motor unit including a motor housing filled with a protecting fluid, and a driven unit, a protecting unit interposed therebetween and comprising a housing forming a reservoir for a protecting fluid, an auxiliary protecting fluid reservoir in communication with said first named reservoir, both of said reservoirs being in communication with said motor housing and means supplemented by the pressure of the fluid surrounding said units for constantly maintaining said protecting fluid under a greater pressure than that of said surrounding fluid.

14. In combination, a vertical oil filled submergible electric motor, a shell housing said motor, a partition in said shell forming a reservoir for a protecting fluid, said reservoir being separated from but in communication with that portion of the shell housing said motor, and means in said shell for maintaining said protecting fluid constantly under a greater pressure than that of the fluid surrounding said shell.

ARMAIS ARUTUNOFF.